United States Patent
Duelk et al.

(10) Patent No.: US 7,822,915 B2
(45) Date of Patent: Oct. 26, 2010

(54) MEMORY CONTROLLER FOR PACKET APPLICATIONS

(75) Inventors: Marcus Duelk, Fair Haven, NJ (US); Praveen Reddy Kasireddy, Sayreville, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 415 days.

(21) Appl. No.: 11/772,135

(22) Filed: Jun. 30, 2007

(65) Prior Publication Data

US 2009/0002864 A1 Jan. 1, 2009

(51) Int. Cl.
 *G06F 12/00* (2006.01)
(52) U.S. Cl. ...................................................... 711/105
(58) Field of Classification Search ........................ None
 See application file for complete search history.

(56) References Cited

U.S. PATENT DOCUMENTS

| | | | |
|---|---|---|---|
| 6,591,349 B1 | 7/2003 | Steinman et al. | |
| 6,745,277 B1 * | 6/2004 | Lee et al. | 711/5 |
| 6,851,035 B1 | 2/2005 | Zhou et al. | |
| 7,185,153 B2 | 2/2007 | Chandra et al. | |
| 7,284,096 B2 * | 10/2007 | Schreter | 711/136 |
| 2003/0108056 A1 | 6/2003 | Sindhu et al. | |
| 2003/0235189 A1 * | 12/2003 | Mathews et al. | 370/379 |
| 2004/0004964 A1 | 1/2004 | Lakshmanamurthy et al. | |
| 2004/0215869 A1 | 10/2004 | Mekkittikul et al. | |
| 2005/0141516 A1 | 6/2005 | Sinha et al. | |
| 2005/0210185 A1 * | 9/2005 | Renick | 711/105 |
| 2006/0031565 A1 | 2/2006 | Iyer et al. | |

OTHER PUBLICATIONS

John Carter et al., "Impulse: Building a Smarter Memory Controller," Proc. of the $5^{th}$ Int. Symp. on High Performance Computer Architecture, HPCA. IEEE Computer Society, Washington, DC, 70, Jan. 9-12, 1999.

Sailesh Kumar et al., "Design of Randomized Multichannel Packet Storage for High Performance Routers," Proc. of the $13^{th}$ Symp. on High Performance Interconnects, HOTI. IEEE Computer Society, Washington, DC, 100-106, Aug. 17-19, 2005.

* cited by examiner

*Primary Examiner*—Tuan V Thai
*Assistant Examiner*—Duc T Doan
(74) *Attorney, Agent, or Firm*—Wall & Tong, LLP (57) ABSTRACT

A method and apparatus for accessing and storing data in a memory are disclosed. The system includes a memory controller coupled to a memory having locations characterized by banks and lines. The memory controller is configured for storing a data packet with data bursts in sequence in consecutive memory locations, while providing the capability of reading or writing data bursts out of sequence by accessing the consecutive memory locations in a random order.

10 Claims, 10 Drawing Sheets

| BANKS | 1 | 2 | 3 | 4 | 5 | 6 | 7 | 8 |
|---|---|---|---|---|---|---|---|---|
| $t_{RC}$ | 0 | 0 | 0 | 0 | 1 | 5 | 0 | 0 |

FIG. 1A

| BANKS<br>LINES | 1 | 2 | 3 | 4 | 5 | 6 | 7 | 8 |
|---|---|---|---|---|---|---|---|---|
| 1 | A1 | A2 | A3 | A4 | A5 | A6 | B1 | B2 |
| 2 | B4 | B5 | B6 | B7 | B8 | B9 | C1 | C2 |
| 3 | C3 | C4 | C5 | D1 | D2 | D3 | D4 | D5 |
| 4 | D6 | D7 | E1 | E2 | E3 | E4 | E5 | E6 |
| 5 | E7 | E8 | E9 | E10 | E11 | E12 | E13 | E14 |
| 6 | E15 | E16 | | | | | | |
| ... | | | | | | | | |
| N | | | | | | | | |

FIG. 1B

| BANKS LINES | 1 | 2 | 3 | 4 | 5 | 6 | 7 | 8 |
|---|---|---|---|---|---|---|---|---|
| 1 | A1 | A2 | A3 | A4 | A5 | | | |
| 2 | | | | | | | | |
| 3 | | | | | | | | |
| 4 | | | | | | | | |
| 5 | | | | | | | | |
| 6 | | | | | | | | |
| ... | | | | | | | | |
| N | | | | | | | | |

FIG. 2A

| BANKS | 1 | 2 | 3 | 4 | 5 | 6 | 7 | 8 |
|---|---|---|---|---|---|---|---|---|
| $t_{RC}$ | 1 | 2 | 3 | 4 | 5 | 0 | 0 | 0 |

FIG. 2B

| BANKS LINES | 1 | 2 | 3 | 4 | 5 | 6 | 7 | 8 |
|---|---|---|---|---|---|---|---|---|
| 1 | A1 | A2 | A3 | A4 | A5 | B1 | B2 | B3 |
| 2 | B4 | B5 | B6 | B7 | B8 | B9 | | |
| 3 | | | | | | | | |
| 4 | | | | | | | | |
| 5 | | | | | | | | |
| 6 | | | | | | | | |
| ... | | | | | | | | |
| N | | | | | | | | |

FIG. 3A

| BANKS | 1 | 2 | 3 | 4 | 5 | 6 | 7 | 8 |
|---|---|---|---|---|---|---|---|---|
| $t_{RC}$ | 0 | 1 | 2 | 3 | 4 | 5 | 0 | 0 |

FIG. 3B

| BANKS | 1 | 2 | 3 | 4 | 5 | 6 | 7 | 8 |
|---|---|---|---|---|---|---|---|---|
| $t_{RC}$ | 0 | 0 | 0 | 0 | 1 | 5 | 0 | 0 |

FIG. 4

| BANKS LINES | 1 | 2 | 3 | 4 | 5 | 6 | 7 | 8 |
|---|---|---|---|---|---|---|---|---|
| 1 | A1 | A2 | A3 | A4 | A5 | B1 | B2 | B3 |
| 2 | B4 | B5 | B6 | B7 | B8 | B9 | C1 | C2 |
| 3 | C3 | C4 | C5 | | | | | |
| 4 | | | | | | | | |
| 5 | | | | | | | | |
| 6 | | | | | | | | |
| ... | | | | | | | | |
| N | | | | | | | | |

FIG. 5A

| BANKS | 1 | 2 | 3 | 4 | 5 | 6 | 7 | 8 |
|---|---|---|---|---|---|---|---|---|
| $t_{RC}$ | 3 | 4 | 5 | 0 | 0 | 0 | 1 | 2 |

FIG. 5B

| BANKS | 1 | 2 | 3 | 4 | 5 | 6 | 7 | 8 |
|---|---|---|---|---|---|---|---|---|
| $t_{RC}$ | 3 | 4 | 5 | 0 | 1 | 0 | 0 | 0 |

MEMORY CONTROLLER FOR PACKET APPLICATIONS

FIELD OF THE INVENTION

The present invention generally relates to a memory controller and method for storing and retrieving data packets to and from memory.

BACKGROUND OF THE INVENTION

Every packet switch or router in a communications network has means to buffer packets, typically realized by a traffic manager (TM) that queues and dequeues the packets from external memory (typically realized with dynamic random access memory, DRAM) based on credits issued by a scheduler. Packet buffering is required either because the forwarding port at which the packet is destined is currently not available or congested, or because the scheduler is currently scheduling other egress ports. To perform packet buffering, the TM needs to implement a memory controller that is managing the DRAM devices in terms of timing and bank access management.

DRAMs are large arrays of memory capacitors that consist of columns and rows in which the information is stored. In order to access one location in the memory array the particular row is selected through a row access select (RAS) pin and related circuitry. Internally, the DRAM connects that row to a chain of so-called sense amplifiers that access certain memory locations, i.e. particular columns or all columns, in that row. As used herein, the word "access" means a write or read process to and from an external memory, or to and from the TM device or any other device involved in a packet buffering operation. Due to the specific operations of DRAMs, a latency is associated with accessing the content in any row of that memory array. This access latency is called the "row-cycle time" ($t_{RC}$), sometimes also referred to as "RAS cycle time" or "random cycle time". For standard synchronous DRAM (SDRAM), the $t_{RC}$ time is on the order of 50 nanoseconds (ns). Special type of DRAM such as fast-cycle RAM (FCRAM) or reduced-latency DRAM (RLDRAM) have $t_{RC}$ times on the order of 25 ns to 15 ns.

DRAMs typically have multiple "banks" of these memory arrays that operate simultaneously. For example, standard double-data rate (DDR) SDRAM devices have four banks while large DDR2 or DDR3 SDRAM devices or RLDRAM devices have eight memory banks. Having more banks available means that memory throughput can be increased by accessing data that is distributed over multiple banks. However, for any given bank, there is still a latency associated with the $t_{RC}$ wait time, during which the memory content stored in any row or column of that particular bank is not accessible. This can have a dramatic impact on access delay times and on overall memory throughput. Therefore, intelligent memory controllers are used to minimize bank access conflicts and increase efficiency, which is measured in packet throughput per second.

Memory controllers in use today are based on linked lists in which a packet to be written or read, to and from the memory, is divided into fragments or bursts, which are then stored in random locations (e.g., banks, rows or columns) of the memory. Whenever a packet is read out, the corresponding memory locations have to be released in order to create additional space, for example, to accommodate another linked list and data bursts. Since linked list management is rather complex and prone to failures, e.g., corruption of one pointer destroys the whole linked list, and it is challenging to achieve high memory efficiencies, there is an ongoing need for improved memory controller for use in high-speed packet applications.

The typical approach for realizing efficient memory controllers is to work with packet fragments that are stored and spread over various memory banks, hence avoiding bank access conflicts due to $t_{RC}$ wait times. That means for each packet, a sequence of "nodes" is created where each node contains fragment information such as memory address, length, or other identifiers, and typically, one pointer linking this node to the next node. In order to access one packet in the memory, the complete list of nodes ("linked list") needs to be processed. This is potentially error-prone because corruption of one pointer may corrupt the whole list. Furthermore, different packets are often sharing fragments and/or linked lists, for example, one common linked list for all packets stored in the same scheduling queue, so that management and correct maintenance of the linked list is of highest priority in these linked list memory controller architectures.

SUMMARY OF INVENTION

The present invention relates to a memory controller for packet applications and a method of data storage using the memory controller.

One embodiment of the invention provides a method of data access and storage, the method includes: (a) providing a memory having a number of locations characterized by M banks and N lines, where M and N are positive integers, (b) providing a first data packet having a first number of data bursts, (c) writing the first number of data bursts to a first plurality of consecutive memory locations to store the data packet, in which the first number of data bursts are stored in sequence in the first plurality of consecutive memory locations.

Another embodiment of the invention provides an apparatus, which includes a memory having memory locations characterized by banks and lines, a memory controller coupled to the memory for storing and retrieving a data packet having a number of data bursts, in which the memory controller is configured to store the number of data bursts in sequence in a plurality of consecutive locations in the memory.

BRIEF DESCRIPTIONS OF THE FIGURES

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention relates to a method of data storage, and a memory controller and architecture that allows the implementation of high-speed (e.g., 10 Gb/s or higher) controllers with significantly lower clock rates and reduced complexity in terms of pointer management and general implementation, as compared to conventional linked list based approaches.

Embodiments of the present invention provide a memory controller and method in which full packets (i.e., entire packets) are stored in a memory in the form of data bursts, with the data bursts for each packet being arranged in the correct sequence and back-to-back without any gaps in the memory locations. That is, the bursts belonging to any packet are stored in the proper order for that packet, and in consecutive memory locations. As used herein, the term "consecutive memory locations" refers to the sequential order in the logical organization of memory locations. Optionally, some or all packets can also be written in consecutive memory locations, i.e., with no gaps in between two packets. If all packets are written in consecutive memory locations, then the highest theoretical memory efficiency may be achieved.

Although the bursts for each packet are stored in sequence, they can, however, be accessed in an out-of-sequence manner, i.e., the writing or reading of these bursts, to or from memory, can be done out of sequence. By allowing out-of-sequence access, the $t_{RC}$ wait times due to bank conflicts can be avoided or minimized, thus allowing the highest theoretical throughput to be achieved. As used herein, the term "in-sequence" storage or access refers to the data bursts in a packet being stored in or accessed from memory locations in the same order as they appear in the packet. The term "out-of-sequence" access (e.g., writing or reading) refers to data bursts being processed in an order different from that in which the bursts appear in the packet.

Since the bursts of each packet are stored in sequence and back-to-back in the memory, only one pointer (or memory address) is needed for each packet, e.g., start address in the form of a row and column address and a bank number, plus the length of the packet. Not only is this architecture less complicated to implement than conventional approaches such as linked list, it is also more robust, i.e., with lower failure probability, fewer number of pointers per packet, and reduced memory space needed for pointers, and so on.

In addition, unlike certain conventional memory controllers, packets are not stored indefinitely in the memory. Instead, they are automatically overwritten after a certain time period. This time period is given by the cycle time through all the locations of the memory after which the memory addresses are wrapped around and writing content to the first memory location will occur again. Since this time is defined solely by the memory density and organization, the memory performance exhibits quasi-deterministic behavior and engineering rules can be simplified. As an example, we consider a packet memory realized with 288 Mbit RLDRAM-II devices that are organized as 8M×36, i.e. eight million (8M) memory locations for a 36-bit wide data bus. The minimum burst length (BL) is two, therefore the maximum number of memory locations available for access is actually four million (4M*2*36-bit=288 Mbit). It will therefore take 4M clock cycles to access all memory locations, independent of the burst length, as shown in Table 1, and independent of the number of RLDRAM devices that are joined together to one entity with one common address bus.

TABLE 1

| Cycle time for 8M × 36 RLDRAM-II based packet memory | | | |
|---|---|---|---|
| Burst length | Memory locations | # clock cycles per burst | Cycle time |
| BL = 2 | 4 million | 1 | 4M clock cycles |
| BL = 4 | 2 million | 2 | 4M clock cycles |
| BL = 8 | 1 million | 4 | 4M clock cycles |

However, it will depend on the organization of the DRAM device, for example, a packet memory built with 16M×18 RLDRAM-II devices will have twice the cycle time of a packet memory built with 8M×36 RLDRAM-II devices. In general, the cycle time can be calculated by the memory size of the DRAM device divided by the number of bits per clock cycle that are sent over the data bus.

An optional system alert may be provided to alert the system operator prior to overwriting old and expired packets. This automatic overwriting feature ensures continued high memory efficiency during operation. It is compliant with all services and service level agreements (SLAs) that may define an upper bound for the forwarding latency in a particular network element, for example 25.5 ms in IEEE 802.17 resilient packet ring (RPR), or typical TCP bounds of 100 ms.

Furthermore, according to embodiments of the present invention, when a packet is read from the memory, the corresponding memory space in the packet buffer (characterized by the row and column addresses and the bank numbers that the packet is stored in) does not need to be released. Instead, only the pointer for the packet is released from the pointer space, while the content in the memory space will automatically be overwritten after one cycle time. Again, such an arrangement helps reduce management complexity, especially when compared to the use of linked lists.

Packet buffers are typically realized with DRAMs and not with SRAMs due to various reasons including lower costs and lower power consumption relative to the memory density. However, since DRAMs are organized in memory banks that store a certain burst size of data, which is given by the product of the data bus width and the burst length (the burst length defines the time duration to write to, or to read from, the same memory location. It also defines the size of each memory location), a memory bank may not be accessible at any arbitrary time for read or write access. Instead, each bank has a particular "row-cycle time" ($t_{RC}$), which defines the wait time expressed in number of clock cycles, after the last access, before this particular bank can be accessed again.

Embodiments of the present invention allow a reduction of this wait time, and are generally applicable to all memory devices that are organized in banks, e.g., synchronous DRAM (SDRAM), reduced latency DRAM (RLDRAM), among others. An example of a memory device that is not organized in banks is static RAM (SRAM).

In the following discussion, the principle of operation of the memory controller of the present invention is explained.

As an example, a DRAM with 8 memory banks is chosen. Furthermore, some of the nomenclature or some of the concepts might be more specific to RLDRAM than to SDRAM or other types of DRAM. However, it is understood that the embodiments can also be applied to other types of DRAMs or suitable memories.

Figure 1A:
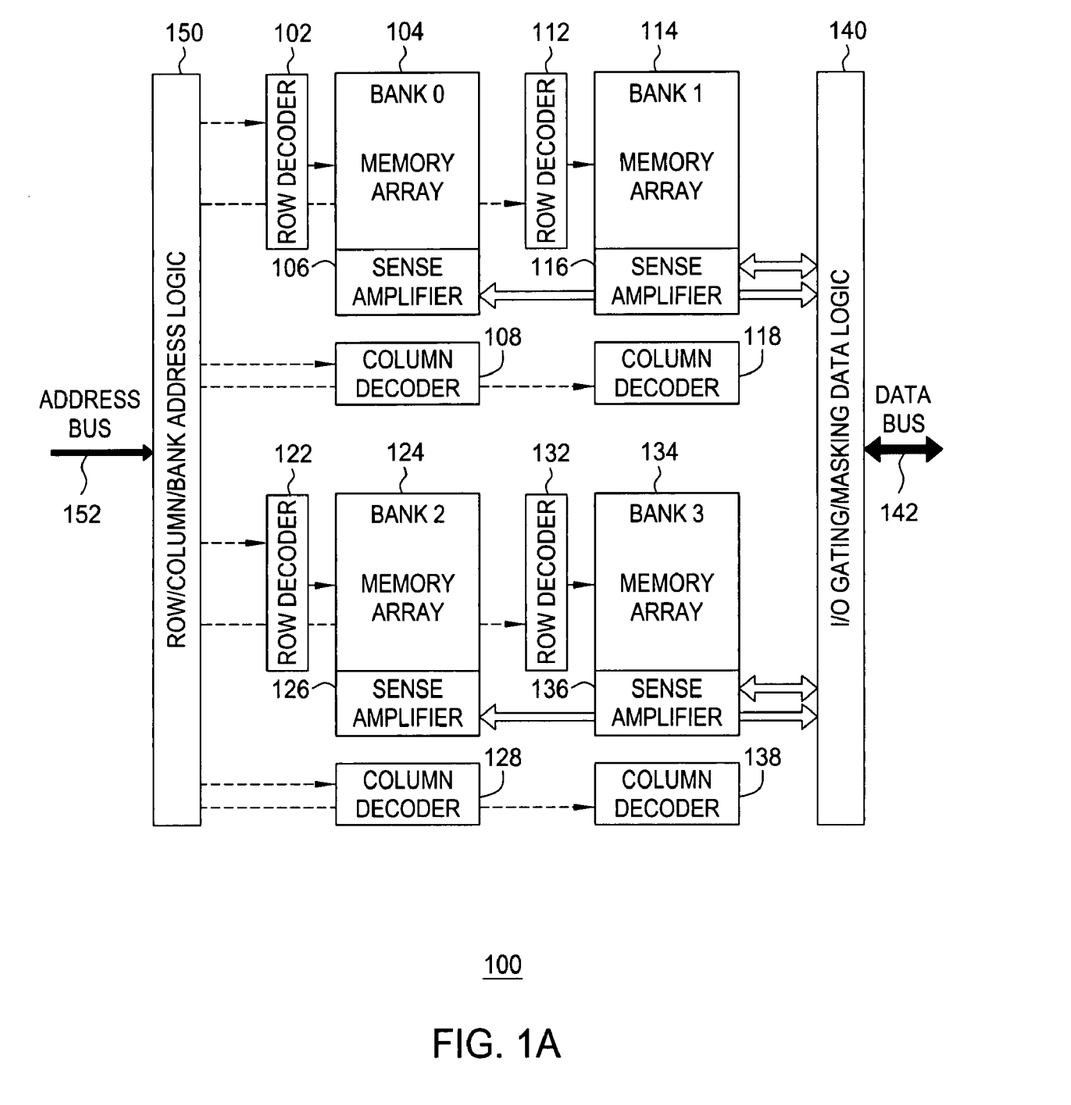
FIG. 1A is a schematic illustration of a DRAM architecture with multiple banks of memory arrays.

FIG. 1A illustrates the general structure of DRAMs with multiple banks of memory arrays organized in rows and columns, which feature a common address and a common data bus. In this example, the DRAM device has four memory banks 104, 114, 124 and 134. Each memory bank has a memory array that is physically organized by $N_R$ rows and $N_C$ columns, where $N_R$ and $N_C$ are positive integers with typically different values. A memory address is sent over a common address bus 152 to a logic block 150 that, depending on the bank address, redirects the command to one of the four row decoders 102, 112, 122 or 132. With the appropriate command, one of the four chains of sense amplifiers 106, 116, 126 or 136 is connected to that particular row of the memory array. The memory address for the particular columns or, optionally, for all columns in that selected row is also sent over the address bus 152 to the same logic block 150 that, again depending on the bank address, redirects the command to one of the four column decoders 108, 118, 128 or 138.

For a WRITE command, data are received over the common data bus 142 and forwarded through a logic block 140 to the four chains of sense amplifiers 106, 116, 126 and 136, where only the activated sense amplifiers, depending on the selected bank, row and column address, will then write the content into the particular memory array. For a READ command, data are read out from the memory array through one of the four chains of sense amplifiers and then forwarded through the logic block 140 onto the data bus 142. Typical values for the width of the data bus per DRAM device are 8, 16 or 32 bit for devices without error-correction code (ECC) or 9, 18 or 36 bit for devices with ECC. Typical values for the width of the address bus per DRAM device are 20-25 bits, depending on the density and the organization of the memory device. As an example, a 20-bit address bus would allow addressing one million memory locations; for a data bus with 36-bit width this would correspond to 36 Mbit density in a single-date rate (SDR) DRAM device or to 72 Mbit density in a DDR-type DRAM device, respectively. In some DRAM devices, for example in RLDRAM devices, the internal organization of the memory in rows and columns is hidden to the memory controller. Instead, the controller only specifies a 3-bit bank address (for 8 banks) and an n-bit memory address. For the purpose of this discussion, the term "lines" refers to the logical organization of DRAMs in general, and not to the physical organization of the memory as rows and columns. The logical organization into memory locations that can be individually addressed depends on the chosen burst length (BL) and the number of physical memory locations of the device, as shown in Table 2.

TABLE 2

Examples for physical and logical organization of DRAMs

| | # banks (M) | # rows ($N_R$) | # columns ($N_C$) | Size of physical memory location | BL | # lines (N) | Size of logical memory location |
|---|---|---|---|---|---|---|---|
| 256 Mbit 16 M × 16 DDR2 SDRAM | 4 | 8k | 512 | 16 bit | 4 | 1 M | 64 bit |
| | | | | | 8 | 512k | 128 bit |
| 1 Gbit 256 M × 4 DDR3 SDRAM | 8 | 16k | 2k | 4 bit | 8 | 4 M | 32 bit |
| 288 Mbit 16 M × 18 RLDRAM-II | 8 | 8k | 256 | 18 bit | 2 | 1 M | 36 bit |
| | | | | | 4 | 512k | 72 bit |
| | | | | | 8 | 256k | 144 bit |

The total number of lines equals the product of number of rows and columns divided by the burst length, i.e. $N=N_R*N_C/BL$. The size of one logical memory location is equal to the density of the memory device divided by the number of banks and the number of lines, as shown in Table 2. For multiple DRAM devices joined together to one entity with one common address bus the size of the logical memory location needs to be multiplied by the number of DRAM devices used, in other words the size mentioned in Table 2 holds for one DRAM device only. The size of one physical memory location is equal to the width of the data bus.

Figure 1B:
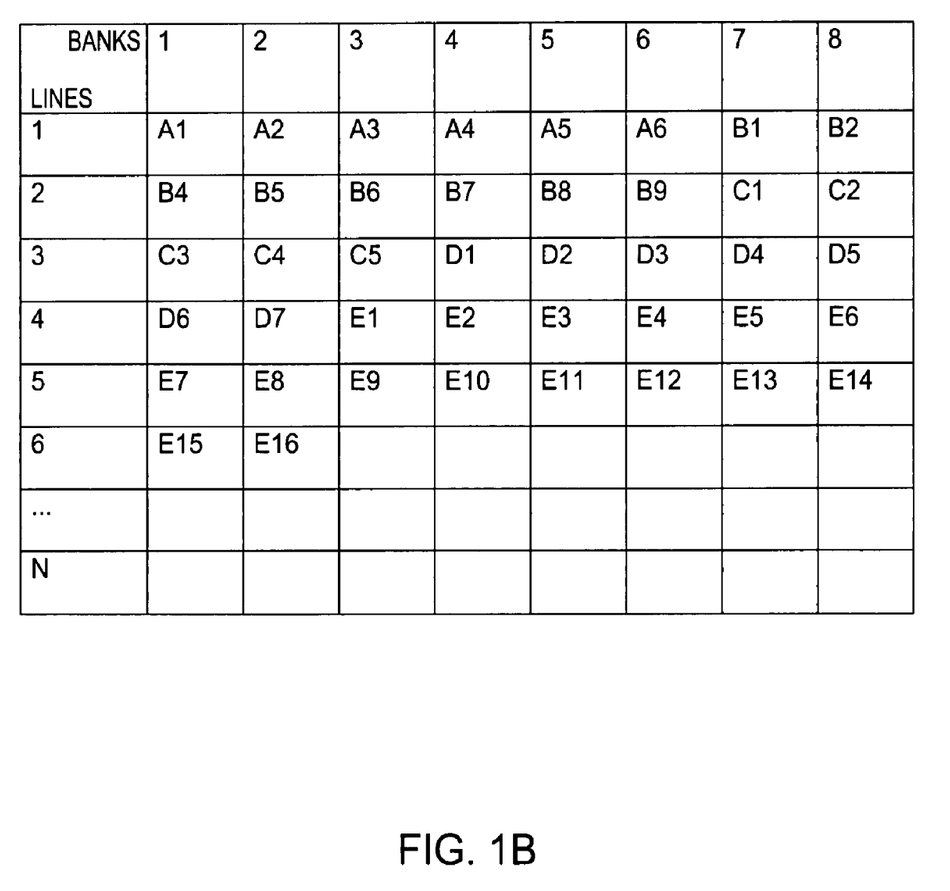
FIG. 1B is a schematic illustration of data packets storage in a memory according to one embodiment of the invention.

FIG. 1B illustrates schematically a memory array that is logically organized into 8 banks and N lines. The total number of logical memory locations is therefore 8 multiplied by N (or 8*N). Furthermore, FIG. 1B shows five data packets A, B, C, D and E with different lengths that are stored in various memory locations of the memory array.

The length of each packet is expressed by a number of bursts. The size of each burst is equal to the size of the logical memory location. Each burst is characterized by a number of valid bytes. For example, a DRAM packet memory has a logical memory location size of 128 bits or 16 bytes. A 64-byte packet will be represented by four bursts of 16 bytes each, where all bytes are valid. A 65-byte packet will be represented by five bursts of 16 bytes each, where the first four bursts have all bytes valid while the last burst has only one byte valid.

Furthermore, each burst is labeled by the packet designation followed by the corresponding burst number for that packet. For example, FIG. 1B shows the five packets stored in memory locations identified by respective bank and line numbers: packet A with 5 bursts, packet B with 9 bursts, packet C with 5 bursts, packet D with 7 bursts, and packet E with 16 bursts. These packets are written into memory in a direction from line 1 to the last line, e.g., packet A being first written to line 1, then packet B, and so on. When the last line N is filled up, then the data is written to line 1 again, that is, the WRITE process performs a wrap-around.

A subsequent packet (i.e., after packet E) will be written to the memory at a start position corresponding to bank 3, line 6. Since the length of any packet to be written to the memory is known, the end position of that packet is also known. For example, a packet with 20 bursts length will have the last burst in bank 6, line 8. Hence, the pointer for this packet would also need to include information about the start position and the length, e.g., number of bursts.

Each packet is stored in sequence, i.e., the bursts for each packet are stored in consecutive memory locations or addresses according to the proper order in which the bursts appear in that packet, for example, but not limited to, in ascending order, that is the first burst in a first memory location, the second burst in a second memory location, and so on. Because the order of the bursts is maintained when stored in the memory, no extra tag or label is required for specifying the position of each burst in a packet. This contrasts with conventional packet buffer schemes, in which a tag or label would be needed for each burst in order to properly re-assemble a packet when it is released from the memory.

According to embodiments of the present invention, during the WRITE process, the bursts do not have to be written into the memory in the correct sequence in which they appear in the data packet (even though the end result is that they are stored in the correct forward or backward sequence). The capability of writing out-of-sequence allows a higher throughput and hence better performance may be achieved. For example, a higher throughput may allow a lower clock frequency to be used, thus reducing power consumption, releasing margins for board design and components, and allowing the use of lower-grade and less expensive memory devices, and so on.

The out-of-sequence bank access also applies to the READ process. While the WRITE process is deterministic, e.g., cycling down the lines until the last line is reached and then wrap-around, the READ process is totally random, i.e., any packet at any bank with any length may need to be accessed at any time. The READ process is typically initiated as a response to an external request.

As an example, in the context of telecommunications, a scheduler may grant a so-called "credit" to a particular scheduling queue managed by a traffic manager. A credit represents a certain number of bytes or a certain bandwidth of data that is granted, and is a common concept found in credit-based flow control and traffic management architectures. By accepting the credit, the traffic manager would then decide to dequeue a particular packet, that is, a particular packet needs to be read from the memory because it is the first packet in that particular queue assigned by the scheduler. To retrieve the packet from memory, each burst in that packet would need to be read. According to embodiments of the present invention, the bursts within the packet can be read out of sequence. This out-of-sequence access capability can result in a reduced wait time.

To further illustrate the concept of this invention, an example is presented below to show an access sequence in which packets, A, B, and C are written into, or read from, memory as it is shown in FIG. 1B. For illustrative purpose, a RLDRAM-II device that is clocked at 300 MHz with a row-cycle time $t_{RC}$ of 6 clock cycles is assumed. Table 3 shows the access sequence with respective actions or steps to be performed for each packet. The length for each packet, e.g., the number of bursts, is shown in parentheses.

TABLE 3

Access Sequence for Packets A, B and C

| | |
|---|---|
| 1. | write packet A to memory (5 bursts) |
| 2. | write packet B to memory (9 bursts) |
| 3. | read packet B from memory (9 bursts) |
| 4. | write packet C to memory (7 bursts) |
| 5. | read packet A from memory (5 bursts) |

Step 1 involves writing packet A to the memory shown in FIG. 1B. For this example, we assume that all banks are available for access, the $t_{RC}$ wait time for each bank is zero. Thus, the controller is able to write the first packet A in sequence into the respective memory locations according to the order shown in Table 4. The term, writing in sequence (or generally, accessing in sequence), means that the bursts belonging to a packet are written to memory in the same order as they appear within the packet, with the first burst being written first.

TABLE 4

Write Sequence for Packet A

| | |
|---|---|
| 1. | Burst A1 → bank 1, line 1 |
| 2. | Burst A2 → bank 2, line 1 |
| 3. | Burst A3 → bank 3, line 1 |
| 4. | Burst A4 → bank 4, line 1 |
| 5. | Burst A5 → bank 5, line 1 |

Figure 2A:
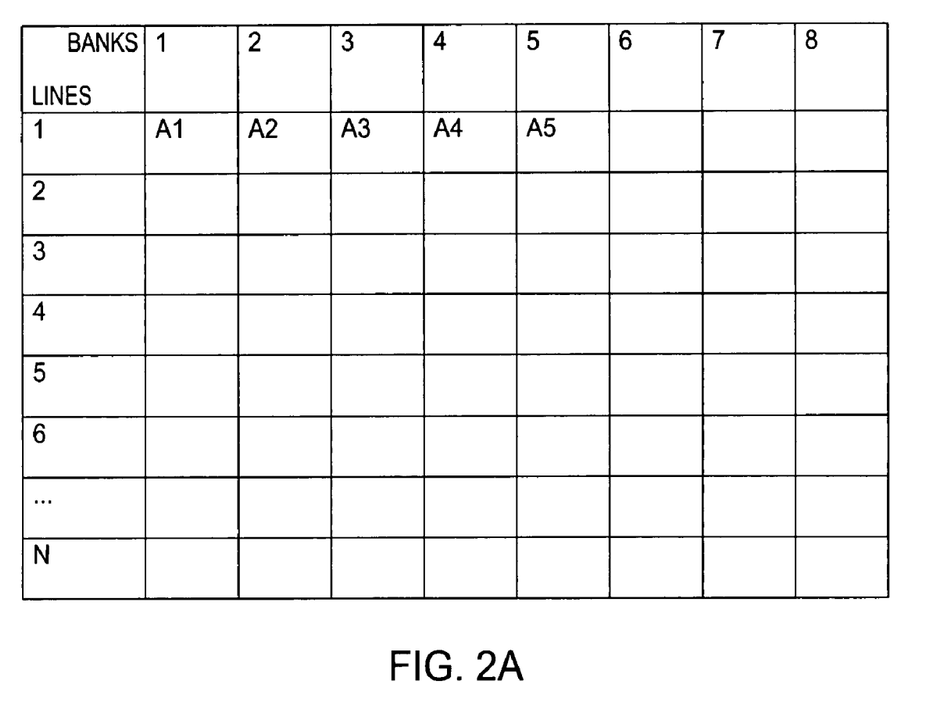
FIG. 2A is a schematic illustration of the storage locations of packet A.

FIG. 2A shows the memory locations in which packet A is stored after it is written into memory. For simplicity sake, the other memory locations are shown as empty in FIG. 2, but they may generally be occupied by data bursts from other packets.

Figure 2B:
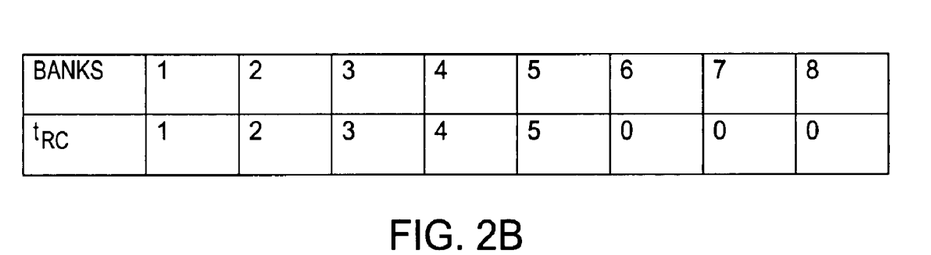
FIG. 2B is a list of the access wait times for the banks in the memory of FIG. 1B after storing packet A.

With a clock frequency of 300 MHz and a $t_{RC}$ of 6 clock cycles, the corresponding $t_{RC}$ wait times (in number of clock cycles) for memory banks 1-8 after storage of packet A, that is after the last clock cycle during which the last burst of packet A was written to the memory, are given in FIG. 2B. Note that the maximum $t_{RC}$ value is 5 and not 6 in this example. In general, the $t_{RC}$ value of a bank after the access is completed is $t_{RC}-1$.

As shown in Table 3, the second step in the access sequence involves writing packet B to the memory. In one embodiment of the present invention, a snapshot of the $t_{RC}$ statistics for the memory, e.g., distribution of $t_{RC}$ over all the banks, is taken at the beginning of each access process, such as prior to a READ or WRITE. In another embodiment of the present invention the $t_{RC}$ statistics for all banks are continuously monitored and updated at all times. Updating $t_{RC}$ statistics means that with each subsequent clock cycle, the $t_{RC}$ values in all banks that are currently not accessed are decreased by one until zero is reached. It also means that the $t_{RC}$ value of the particular bank that is currently accessed during that clock cycle will be set to the $t_{RC}$ value that corresponds to the clock frequency, for example a value of 6 for a clock frequency of 300 MHz in RLDRAM-II.

Thus, prior to writing packet B, the memory controller takes a snapshot of and analyzes the current $t_{RC}$ statistics in order to determine the best sequence with which to write the bursts of packet B to the memory. In this example, it is assumed that there is no interrupt or other access request for the memory between writing packet A and packet B. Thus, the $t_{RC}$ statistics given in FIG. 2B (immediately after packet A is written), is also the same as the statistics before writing packet B. Table 5 shows the write sequence that the memory controller will use for writing the 9 bursts of packet B.

TABLE 5

Write Sequence for Packet B

| | |
|---|---|
| 1. | B1 → bank 6, line 1 |
| 2. | B2 → bank 7, line 1 |
| 3. | B3 → bank 8, line 1 |
| 4. | B4 → bank 1, line 2 |
| 5. | B5 → bank 2, line 2 |
| 6. | B6 → bank 3, line 2 |
| 7. | B7 → bank 4, line 2 |
| 8. | B8 → bank 5, line 2 |
| 9. | B9 → bank 6, line 2 |

In this example, the memory controller is able to write packet B in sequence into the respective memory locations because the corresponding banks are available for access.

According to embodiments of the present invention, bursts of a packet are written to, or read from, the memory in blocks that have a length of Q bursts. In one embodiment of the present invention, the block size Q is equal to $t_{RC}$, e.g., a block of Q=4 bursts for a $t_{RC}$ value of 4 clock cycles. In another embodiment of the present invention, the block size Q is equal to the number of banks M, e.g., a block size of Q=8 bursts for RLDRAM-II devices having M=8 memory banks. Other embodiments of the present invention may use even longer block sizes, e.g., Q=2*M, in order to achieve certain performance benefits. Using blocks with a minimum size of $t_{RC}$, i.e. Q≧$t_{RC}$, when accessing DRAMs can result in improved memory performance. This is explained as follows.

For example, a block size of Q=$t_{RC}$ is chosen. The actual number of bursts in any block is at least equal to one, and at most equal to Q. For longer packets whose number of bursts exceeds the block length Q, and hence will be written to, or read from, the memory in multiple blocks, the last block may have an actual number of bursts between 1 and Q. The number of bursts in the last block is equal to Q if the number of bursts in the packet is a multiple of Q. If the number of bursts in the packet is not a multiple of Q, then the number of bursts in the last block will be less than Q. All other blocks will have exactly Q number of bursts.

If the number of bursts in a block is equal to Q, then the block of Q bursts can be written to, or read from, the memory without any wait penalty, i.e. without any additional clock cycle to wait for a bank to be accessed. This is because the minimum length for a block is $t_{RC}$. If, however, the last block has a number of bursts that is less than Q, then there may be a non-zero wait penalty.

As another example, a block size of Q=M is considered, i.e. the block size is equal to the number of memory banks. The row-cycle time $t_{RC}$ may have the same value or may have a different value. In RLDRAM-II devices, for example, the maximum possible $t_{RC}$ value is M, in other words $t_{RC}$≦Q=M. Similar to the previous example, a block could be written to, or read from, the memory without any $t_{RC}$ wait time as long as the number of actual bursts inside the block is equal to Q. In this case, for any $t_{RC}$ statistics, there would be in any clock cycle always at least one bank available with a zero $t_{RC}$ value that would allow memory access.

If Q=M then the $t_{RC}$ statistics will not change between the blocks, i.e. the sequence in which the bursts of a block are written to, or read from, the memory will be the same for all blocks. If Q<M then the $t_{RC}$ statistics will change from block to block and will therefore require a new snapshot to be taken in the beginning of each block. Since in some embodiments of the present invention, the $t_{RC}$ statistics are continuously monitored and updated with every clock cycle, this requirement may not represent additional complexity for implementation.

In the case of writing packet B with a total of 9 bursts to the memory, as shown in Table 5, it is obvious that this packet will be written in at least two blocks to the memory as long as the number of memory banks is maximum 8. In one embodiment of the present invention, the block size would depend on the clock frequency. Using, for example, 288 Mbit RLDRAM-II devices, the block size would be Q=$t_{RC}$=4 for a clock frequency of 200 MHz or less, hence requiring a total of 3 blocks with the last block having only one burst inside. For a clock frequency of 201-300 MHz, the block size would be Q=$t_{RC}$=6, hence requiring a total of 2 blocks with the last block having three bursts inside. And for a clock frequency of 400 MHz or more, the block size would be Q=$t_{RC}$=8, hence requiring 2 blocks with the last block having only one burst inside. In another embodiment of the present invention using the same RLDRAM-II devices the block size would be set to Q=M=8 independent of the clock frequency. It is understood that the block size could be also set to other values, for example values larger than M, which may give further benefits in terms of memory throughput.

Furthermore, it can be shown that for embodiments of the present invention where the block length is set to the row-cycle time, i.e. Q=$t_{RC}$, no $t_{RC}$ wait cycles will be experienced under any circumstances, i.e. for any packet length, if two conditions are satisfied:

1. The number of bursts that are needed to read or write the minimum packet size is equal to the block size Q=$t_{RC}$
2. The DRAM packet memory has M number of banks where M≧2*Q=2*$t_{RC}$ These two conditions are met, for example, with a RLDRAM-II memory (M=8) with a 64-bit wide data bus (16 bytes per clock cycle) that easily supports 10 Gigabit Ethernet (minimum frame size 64 bytes) with a clock frequency of 200 MHz or less ($t_{RC}$=4=Q). For all packet sizes no $t_{RC}$ wait time will be experienced. The reason is that because of M=2*$t_{RC}$ all memory banks in the last block will have a zero $t_{RC}$ value, which means that any number of bursts can be written to, or read from, the memory.

Furthermore, embodiments of the present invention can be optimized for lower access latencies by allowing interrupts for either READ or WRITE process. For example, a jumbo packet with a length of 9,200 bytes needs to be written to, or read from, the memory. A DDR-type memory with a 64-bit wide data bus will write to, or read, 16 bytes per clock cycle to/from the memory. It will therefore take 575 clock cycles to complete the READ or WRITE process of such a jumbo packet. With a clock frequency of 200 MHz this would relate to an access latency of 2.875 μs which can be a substantial latency for certain applications. Hence, embodiments of the present invention may allow interrupts within a READ process in order to give access request to the WRITE process or vice versa. Interrupts and granting access requests typically occurs to the opposite type of access process, in other words a WRITE process would interrupt to grant memory access to a READ process, but its occurrence is not limited to it. Interrupts should occur on the boundary of blocks with length Q, but are not limited to it. After each interrupt, though, it is necessary to obtain a new snapshot of the $t_{RC}$ statistics of the memory banks before the WRITE or READ process can continue. Using interrupts does not eliminate the benefits of this present invention because bursts are still written back-to-back to the memory and still only one pointer per packet is needed, among other benefits mentioned.

Figure 3A:
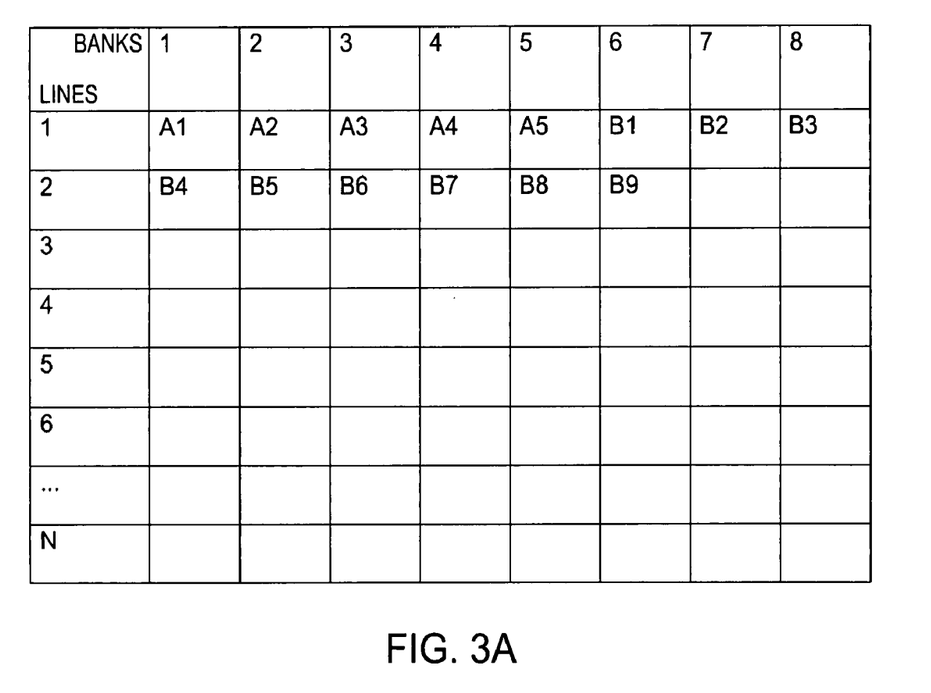
FIG. 3A is a schematic illustration of the storage locations of packets A and B.
Figure 3B:
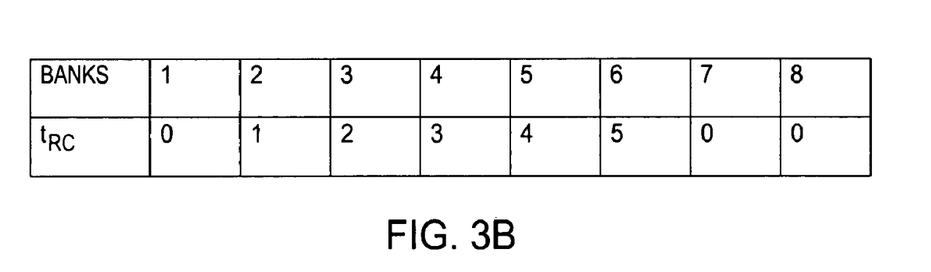
FIG. 3B is a list of the access wait times for the banks in the memory of FIG. 1B after storing packet B.

Returning to the access sequence of Table 3, after step 2 of writing packet B to the memory, the memory locations for packets A and B are shown in FIG. 3A. FIG. 3B shows the $t_{RC}$ snapshot prior to the subsequent access step.

As shown in Table 3, step 3 in the access sequence involves reading packet B, whose first burst is stored at bank 6, line 1. However, FIG. 3B shows that bank 6 still has a $t_{RC}$ wait time of 5 clock cycles, and is not available for immediate access. Thus, in accordance with one embodiment of the present invention, the controller reads packet B out of sequence, instead of reading packet B in sequence (which would have required waiting through the 5 clock cycles to access bank 6, line 1 in order to read the first burst B1).

Since bank 7 is available for immediate access, as shown by the zero $t_{RC}$ in FIG. 3B, the controller can read burst B2 by accessing bank 7, line 1 as a first step in the read sequence for packet B. According to one embodiment of the invention, the memory controller will read burst B1 as soon as bank 6 becomes available for access, i.e., after 5 clock cycles. Table 6 shows a possible access sequence for reading packet B.

TABLE 6

Read sequence for packet B

| | |
|---|---|
| 1. | bank 7, line 1 → B2 |
| 2. | bank 8, line 1 → B3 |
| 3. | bank 1, line 2 → B4 |
| 4. | bank 2, line 2 → B5 |
| 5. | bank 3, line 2 → B6 |
| 6. | bank 6, line 1 → B1 |
| 7. | bank 4, line 2 → B7 |
| 8. | bank 5, line 2 → B8 |
| 9. | wait ($t_{RC}$ on bank 6 = 3) |
| 10. | wait ($t_{RC}$ on bank 6 = 2) |
| 11. | wait ($t_{RC}$ on bank 6 = 1) |
| 12. | bank 6, line 2 → B9 |

In this example, after bursts B2-B6 are read in the first 5 cycles, the $t_{RC}$ for bank 6 becomes zero, and bank 6 is available for access. Thus, at the $6^{th}$ clock cycle (step 6 in Table 6), the memory controller will access bank 6, line 1 to read burst B1, followed by reading bursts B7 and B8 from their corresponding memory locations.

As shown in FIG. 3A, bank 6 has to be accessed twice: once for reading B1 and another for reading B9. Therefore, the controller cannot access bank 6 immediately after reading the bursts B1-B8 (shown in steps 1-8 of Table 6), because of the non-zero $t_{RC}$ for bank 6. For any block lengths like Q=4, Q=6 or Q=8, for example, no $t_{RC}$ wait time occurs in the first block, where the number of bursts is equal to the block length, while the $t_{RC}$ wait time occurs in the last block where the number of bursts to be read is less than the block length Q. Hence, the controller has to wait through additional clock cycles shown in steps 9-11 of Table 6, until the $t_{RC}$ for bank 6 becomes zero again before burst B9 can be read.

This example shows that although a $t_{RC}$ wait time cannot be avoided or completely eliminated, the capability for out-of-sequence access allows the wait time to be reduced or minimized. In this case, a total of 12 clock cycles is needed to read the 9 bursts for packet B, i.e., three extra clock cycles are incurred by the wait time. However, this still compares favorably with the situation in which access has to be done in-sequence (i.e., without out-of-sequence access capability), which would have required a total wait time of 5 extra cycles for the initial access to bank 6, line 1.

Figure 4:
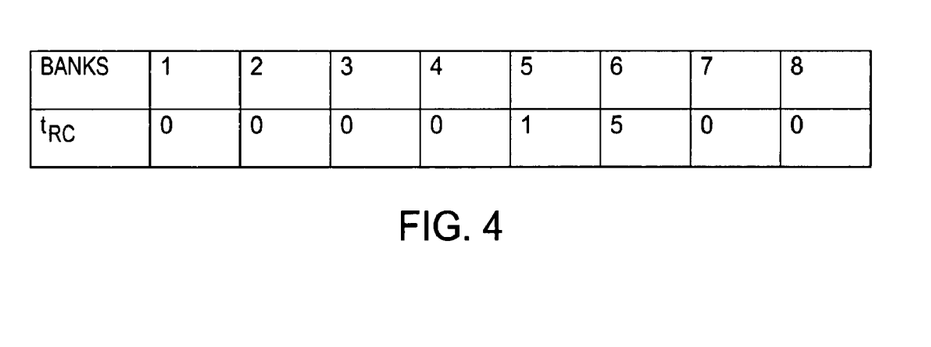
FIG. 4 is a list of the access wait times for the banks in the memory of FIG. 1B after reading packet B.

After packet B is read, the $t_{RC}$ distribution at the beginning of a subsequent READ or WRITE access is given in FIG. 4.

As shown in Table 3, step 4 in the access sequence involves writing packet C (with 5 bursts) to the memory, with the start location/address at bank 7, line 2. At this time, all banks required for writing the bursts in packet C (i.e., banks 7, 8, 1, 2 and 3) are available for immediate access. Thus, a possible write sequence for packet C is shown in Table 7.

TABLE 7

Write Sequence for Packet C

| | |
|---|---|
| 1. | C1 → bank 7, line 2 |
| 2. | C2 → bank 8, line 2 |
| 3. | C3 → bank 1, line 3 |
| 4. | C4 → bank 2, line 3 |
| 5. | C5 → bank 3, line 3 |

Figure 5A:
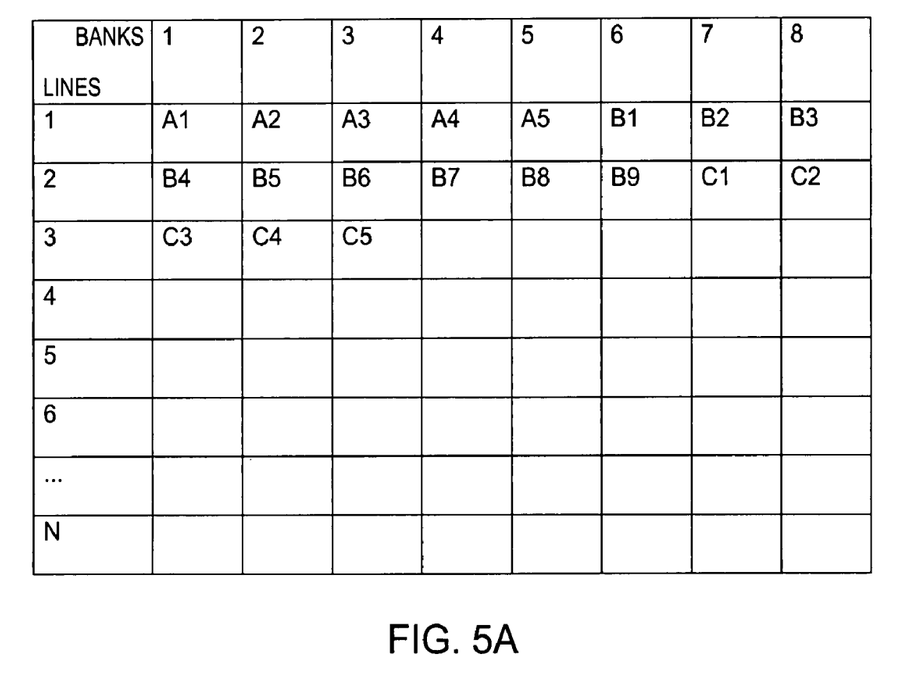
FIG. 5A is a schematic illustration of the storage locations of packets A, B and C.
Figure 5B:
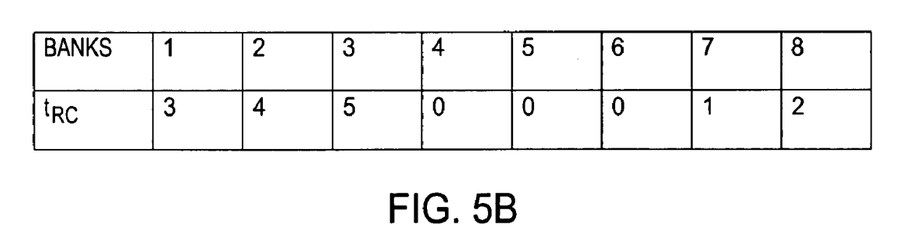
FIG. 5B is a list of the access wait times for the banks in the memory of FIG. 1B after storing packet C.

After writing packet C, the memory locations for packets A, B and C are shown in FIG. 5A. The $t_{RC}$ wait times after writing packet C, at the beginning of the subsequent memory access, is shown in FIG. 5B.

As shown in Table 3, step 5 of the access sequence involves reading packet A (with the first burst A1 stored at bank 1, line 1) from the memory. The number of bursts of packet A (5) is less than the $t_{RC}$ value (6), which means that $t_{RC}$ wait times may occur. Due to the non-zero wait times for banks 1, 2 and 3, the reading of packet A needs to be performed out-of-sequence, as shown in Table 8.

TABLE 8

Read Sequence for Packet A

| | |
|---|---|
| 1. | bank 4, line 1 → burst A4 |
| 2. | bank 5, line 1 → burst A5 |
| 3. | wait ($t_{RC}$ = 1 for bank 1) |
| 4. | bank 1, line 1 → burst A1 |
| 5. | bank 2, line 1 → burst A2 |
| 6. | bank 3, line 1 → burst A3 |

Figure 6:
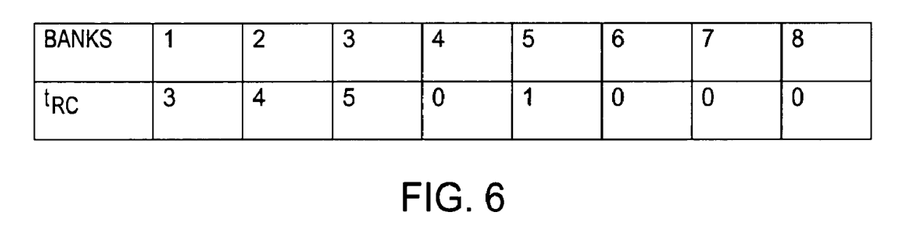
FIG. 6 is a list of the access wait times for the banks in the memory of FIG. 1B after reading packet A.

In this case, it takes one more clock cycle than the actual number of bursts to read packet A because of the wait time to access bank 1. After reading packet A, the $t_{RC}$ snapshot at the beginning of the next memory access is shown in FIG. 6.

Again, although this scheme cannot fully prevent $t_{RC}$ wait times, the capability of out-of-sequence access for writing or reading helps minimize or reduce the $t_{RC}$ wait time, compared to the case in which out-of-sequence access is not available. This is clearly demonstrated in the examples of Table 9 for a DRAM memory with M=8 banks. For the case where the block length Q is equal to the row-cycle time $t_{RC}$, the worst-case $t_{RC}$ wait time for out-of-sequence memory access is given by $t_{RC}$ minus the number of bursts inside a block, while the worst-case $t_{RC}$ wait time for in-sequence memory access is $t_{RC}-1$.

TABLE 9

Comparison of $t_{RC}$ wait times for in-sequence and out-of-sequence access

| Row-cycle time $t_{RC}$ | #bursts in block with length Q = $t_{RC}$ | $t_{RC}$ wait time with in-sequence access (worst case) | $t_{RC}$ wait time with out-of-sequence access (worst case) |
|---|---|---|---|
| 6 | 6 | 5 | 0 |
| 6 | 5 | 5 | 1 |
| 6 | 4 | 5 | 2 |
| 6 | 3 | 5 | 3 |
| 6 | 2 | 5 | 4 |
| 6 | 1 | 5 | 5 |
| 4 | 4 | 3 | 0 |
| 4 | 3 | 3 | 0 |
| 4 | 2 | 3 | 0 |
| 4 | 1 | 3 | 0 |

Thus, embodiments of the present invention allow the theoretical maximum memory efficiency to be achieved, with a trade-off between reduced complexity of pointer management (e.g., back-to-back storage of bursts with one pointer per packet) and performance (e.g., bank access conflicts may be completely avoided with linked lists).

In general, short packets that need to be written to, or read from, the memory are most challenging for any memory controller. Many protocols define a minimum packet size, for example the minimum frame size in IEEE 802.3 Ethernet is 64 bytes, and packet memories and associated memory controllers are designed such that these minimum size packets are well supported (even though all packet sizes have to be supported, i.e. have to achieve the required memory throughput).

As mentioned previously, if the minimum packet size (i.e., number of bursts) is equal to the $t_{RC}$ value and the memory has at least $2*t_{RC}$ memory banks, then data access according to this scheme will not have any $t_{RC}$ wait times at all. This is the case, for example, for a 10 Gb/s packet memory realized with two 36-bit 288-Mbit RLDRAM-II common I/O (CIO) devices running at 175 MHz with $t_{RC}=4$. The data bus width is 64 bit, 8 bit are used for ECC, burst length is BL=2. The raw throughput of the data bus is 64-bit*175 MHz*2=22.4 Gb/s. Since no $t_{RC}$ wait times occur, all frame sizes of 10 Gigabit Ethernet are supported. This compares to 250-280 MHz clock frequencies that are typically used in 10 Gb/s packet memories.

Figure 7:
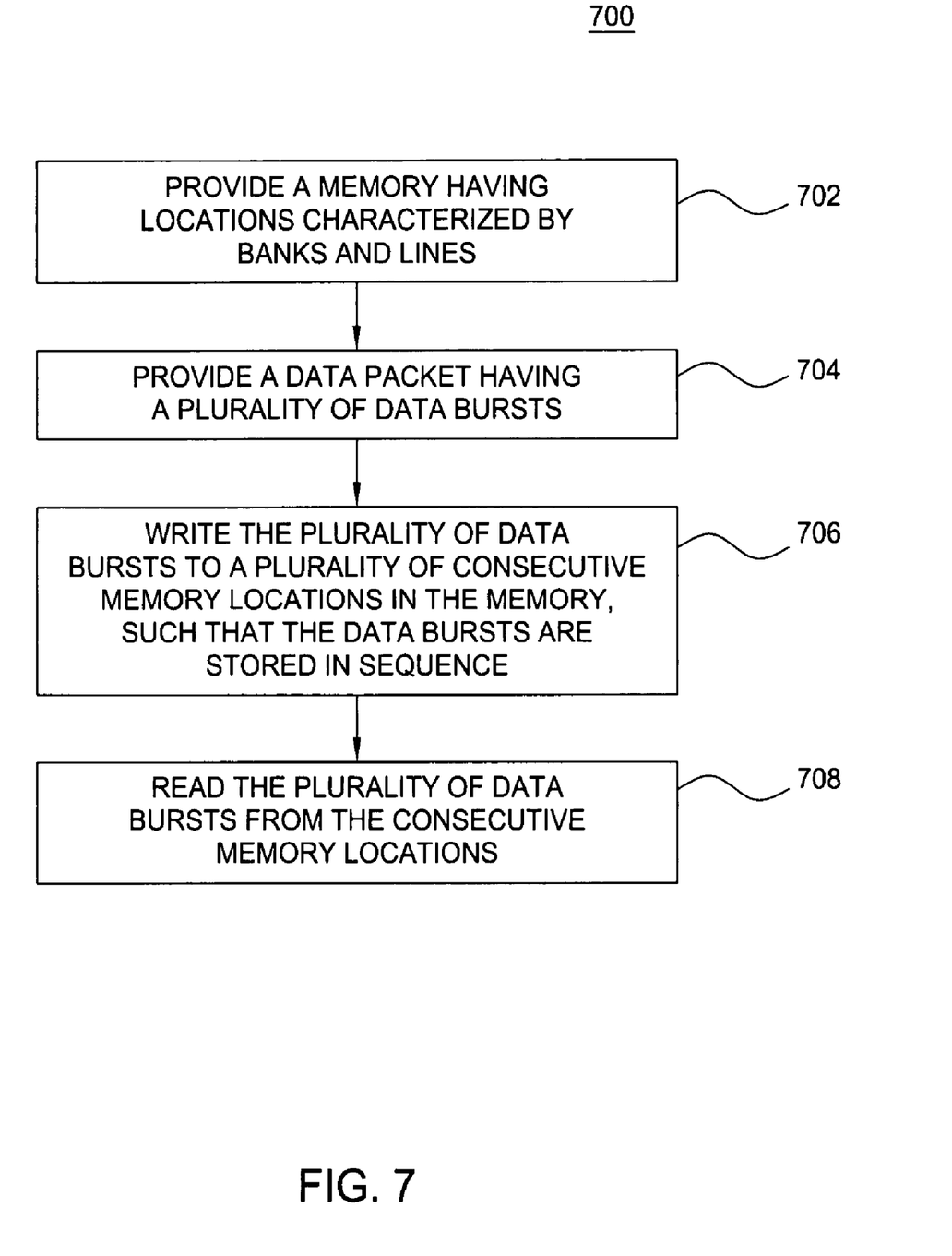
FIG. 7 is a flow diagram illustrating a method according to one embodiment of the present invention.

FIG. 7 illustrates some general steps in implementing data storage and access according to a method 700 of the present invention. The method provides a memory with locations characterized by banks and lines, e.g., columns and rows for DRAMs, (step 702) and a data packet with a plurality of data bursts (step 704). The bursts of this data packet are written to consecutive memory locations of the memory, such that the bursts are stored in forward or backward sequence in the memory locations (step 706). In step 708, the plurality of data bursts for the packet are read, as needed, from the consecutive memory locations. In general, even though the bursts of the data packet are stored in-sequence in the respective memory locations, the process of reading or writing of these bursts can be done either in-sequence or out-of-sequence.

The method can generally be implemented in any memory controller using standard design software for field programmable gate arrays (FPGAs) or application specific integrated circuits (ASICs). The method can, in principle, be also implemented on any type of processor (e.g., CPU) if the required speed can be achieved. Thus, one embodiment of the invention provides a computer readable medium that has stored software instructions, that, when executed by a processor, perform the steps of method 700.

FIG. 8 illustrates schematically another embodiment of a method of writing one or more data packets to a memory according to the present invention. Method 800 provides a memory with locations characterized by banks and lines, and a memory controller coupled to the memory (step 802). The number of banks is represented by M, and the number of lines is represented by N, where M is an integer at least equal to 2, and N is an integer at least equal to 1. A data packet characterized by a number of data bursts, P, is also provided, as illustrated in step 804. P is an integer at least equal to 1.

In step 806, a number of consecutive memory locations are identified for storing the P data bursts of the packet. This is typically implemented using a so-called "write pointer" that points at the memory location at which writing of any incoming bursts will be realized. The writing of the P data bursts may start at a memory location that immediately follows the last write location (in a consecutive location), for example, to allow maximum or efficient use of available storage. Alternatively, the P data bursts may be written in any available or suitable locations, i.e., the start location for the data bursts of a packet does not have to be correlated to the last write location used for storing another packet.

In step 808, the P data bursts are grouped or divided into a number of different blocks, each block having a length Q. As previously discussed, the block length (or block size) may have different values, e.g., it may be at least equal to $t_{RC}$, or less than or equal to the number of banks in the memory (i.e., $Q \leq M$), or it may have even larger block sizes (e.g., larger than M, or multiples of M) that may result in certain performance benefits. In the case where Q is at least equal to $t_{RC}$ (i.e., $Q \geq t_{RC}$), improved memory performance can also be achieved. If P is less than or equal to Q, then there will only be one block of P data bursts to be written to memory. If P is greater than Q, and is not a multiple of Q, then the last block of the packet will have a number of data bursts that is less than Q (but at least equal to 1), while the rest of the blocks will each have Q data bursts.

In step 810, a block of data bursts is selected from the different blocks of the data packet. The selected block may be any block of the data packet to be written into memory. For example, the block may correspond to the block containing the first or initial Q bursts appearing in the data packet, or it may be any other block that is not yet written into memory. That is, the order in which the blocks of data bursts are written into memory does not have to be in the same order in which the data bursts appear in the packet (i.e., the blocks do not have to be selected or written in-sequence).

Figure 8A:
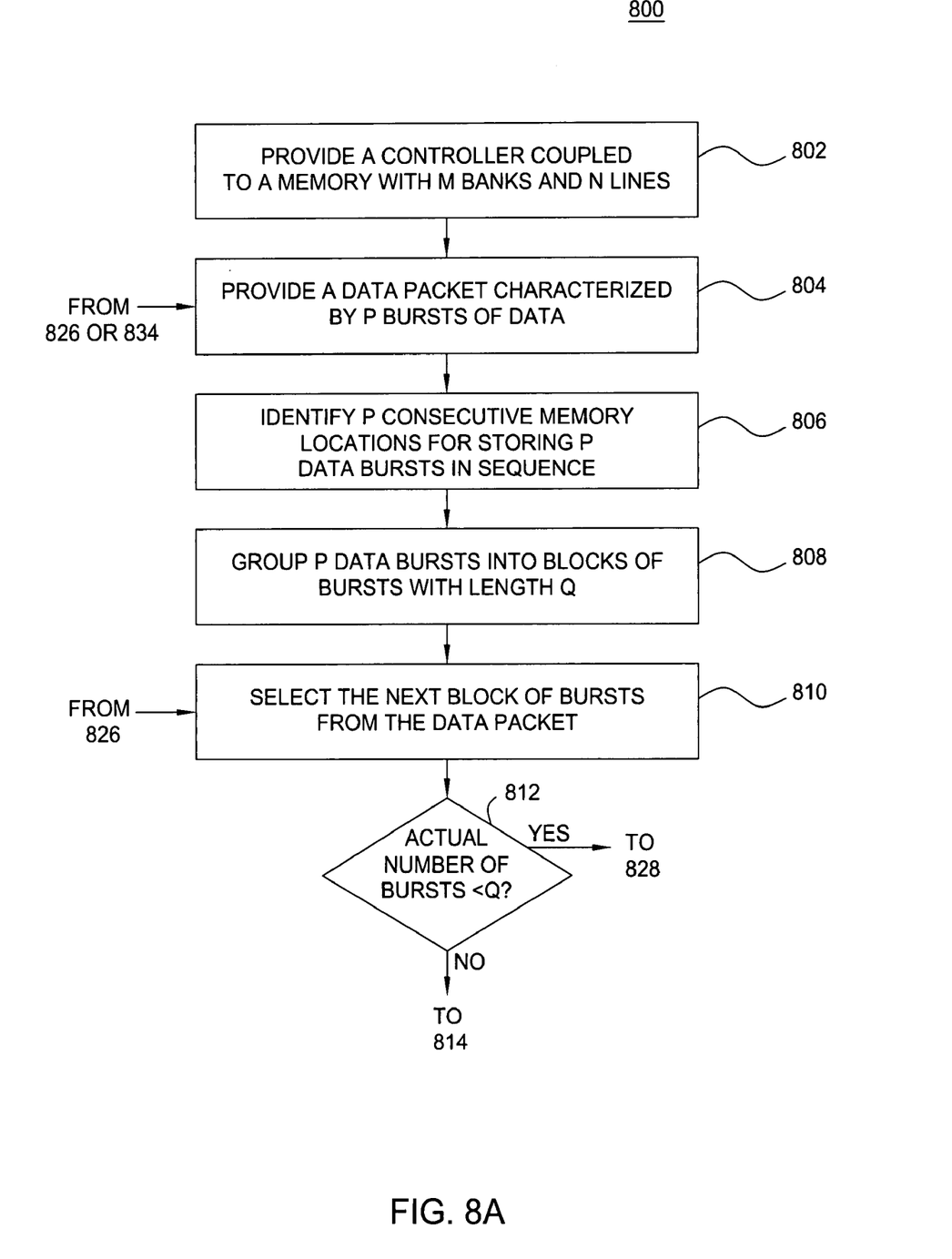
FIG. 8 is a flow diagram illustrating a method according to another embodiment of the present invention.

In step 812, an inquiry is made as to whether the number of bursts in the selected block is less than Q. If the answer is "no", e.g., the number of bursts is equal to Q, then the method proceeds to block 814 shown in FIG. 8B.

Figure 8B:
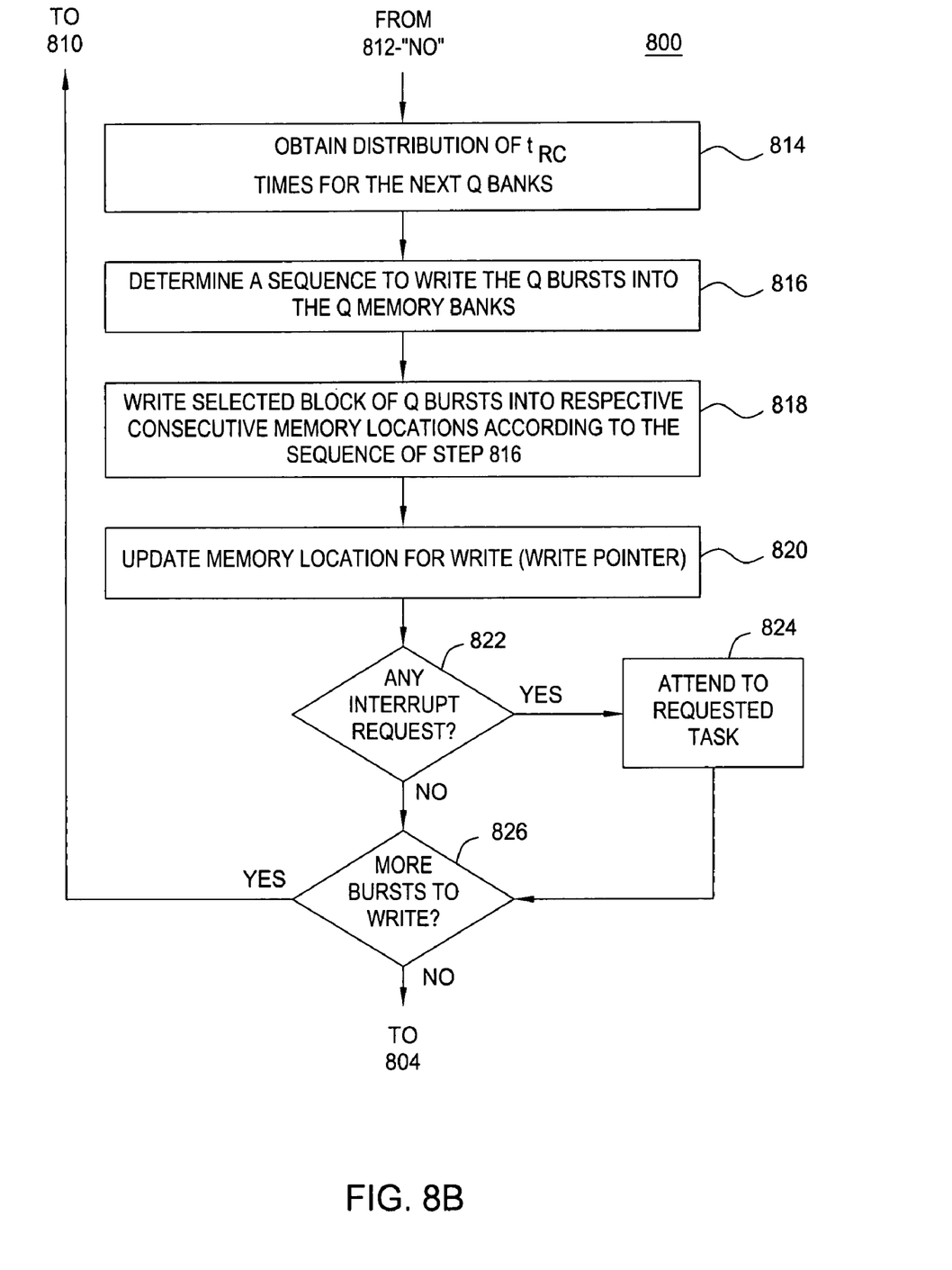

In step 814, a distribution of $t_{RC}$ is obtained for the corresponding Q banks, i.e., the banks that need to be accessed for writing the block of Q data bursts. In this case, at least one of these banks will have a zero $t_{RC}$ time, meaning that at least one of the banks is available for immediate access, with no wait time. The banks that will be accessed are determined based on the memory locations selected for storing the data bursts, subject to the constraint that there should be no gaps in the memory locations between data bursts belonging to the same data packet. However, it is acceptable to have one or more gaps in the memory locations between two data bursts (or blocks) belonging to different data packets, even though it may reduce the memory efficiency.

In step 816, a sequence for writing the Q data bursts (of the selected block) in the corresponding Q memory banks is determined by the memory controller. In one embodiment, the sequence is determined based on the $t_{RC}$ distribution so as to minimize the time required for writing the selected block to memory. The data bursts of the selected block may be written to the respective memory locations in sequence or out of sequence, depending on the access availability of the respective banks indicated by the $t_{RC}$ distribution.

In step 818, the Q bursts in the selected block is written into respective memory locations according to the sequence determined in step 816. Even though the memory locations for the Q bursts are consecutive locations in the memory, the order for writing the data bursts does not have to be the same as the order of the consecutive memory locations. It should be noted that, in case the block length Q=$t_{RC}$, step 818 can be executed without any $t_{RC}$ wait penalty because the number of bursts is equal to the block length Q.

After the block of Q data bursts is written, the memory location for the write pointer is updated, as shown in step 820. In one embodiment, the write pointer is updated so that a subsequent writing data bursts will start at a location immediately following (e.g., consecutive to) the last written memory location, which allows for a more efficient use of available memory. However, other alternatives for the write pointer location for subsequent writing may also be acceptable.

In step 822, an inquiry is made to see if there is any interrupt request (e.g., an access request not related to the writing of the current data packet, such as a READ or a WRITE request). If there is no interrupt request, the method proceeds to step 826, which will be discussed below. If there is an interrupt request, then the requested task, e.g., a read task, is attended to, as shown in step 824. After attending to or performing the requested task, the method goes to step 826 to continue with the writing of the data packet being processed.

In step 826, an inquiry is made as to whether there are more data bursts from the current data packet to be written to memory. If the answer is "yes", the method goes back to step 810 (in FIG. 8A), for selecting another block of data to be written. Note that if there is no interrupt request in step 822 during the writing of this packet, then the step 814 (from the 810-812 path) of obtaining $t_{RC}$ distribution may be optional, depending on the specific relationship between the block length and the number of memory banks.

If the answer in step 826 is "no", i.e., no more bursts from the current data packet to be written, the method may proceed to step 804 (in FIG. 8A) for writing another data packet, if needed. Alternatively, the controller may proceed to perform other tasks (not shown), including accessing memory locations for reading one or more data packets. As previously discussed, the reading of data packets may be performed either in-sequence or out-of-sequence.

Figure 8C:
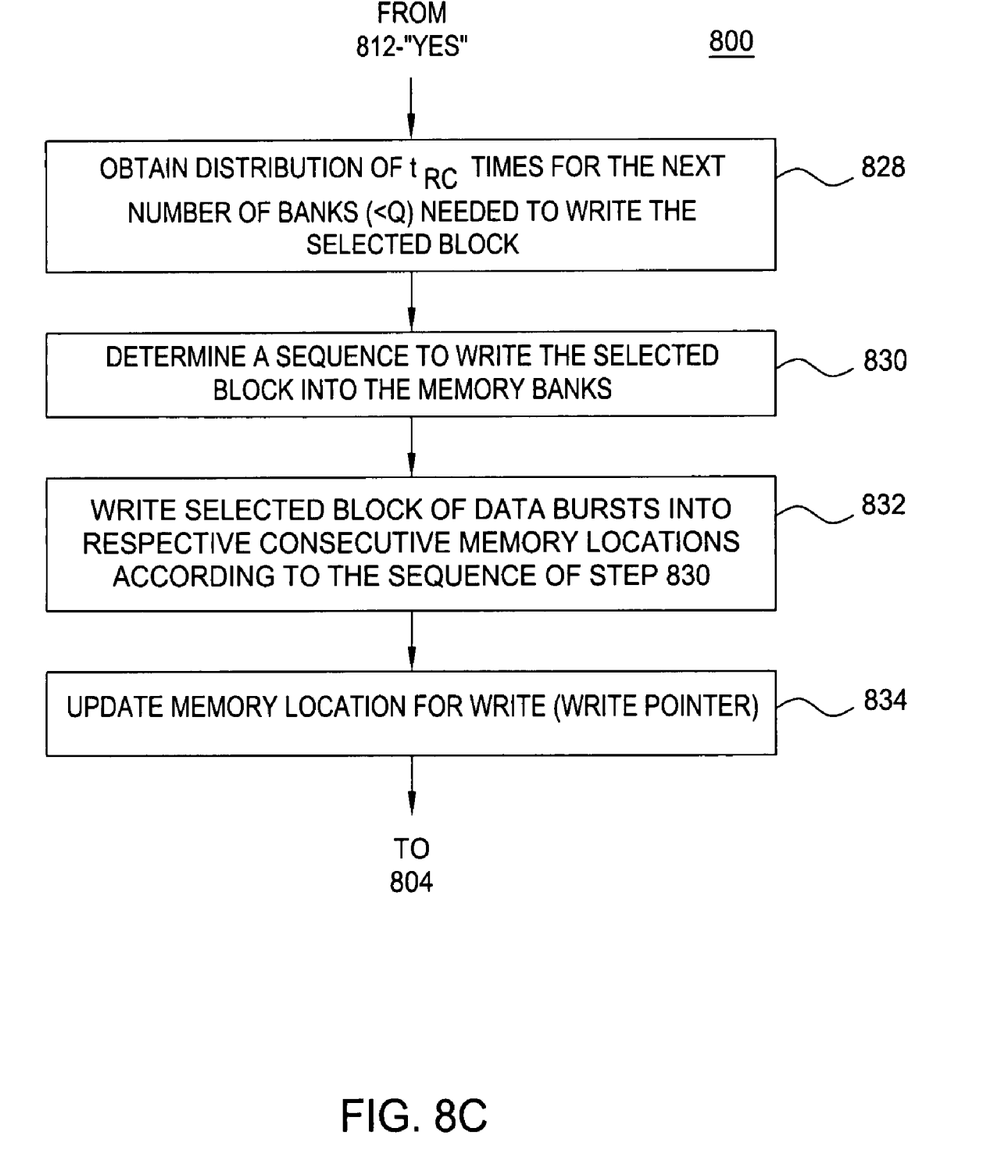

Referring back to step 812 in FIG. 8A, if the number of data bursts in the selected block is less than Q, then the method proceeds to step 828, which is shown in FIG. 8C. This corresponds to the end of the packet, i.e. the last block that needs to be written to, or read from, the memory. In step 828, a distribution of $t_{RC}$ is obtained for the corresponding number of banks (less than Q), i.e., the banks to be accessed for writing the selected block of data bursts.

In step 830, a sequence for writing the selected block of data bursts in the corresponding number of memory banks is determined, e.g., by the memory controller. In one embodiment, the sequence is determined based on the $t_{RC}$ distribution from step 828 so as to minimize the time required for writing the selected block to memory. The data bursts of the selected block may be written to the respective memory locations in sequence or out of sequence, depending on the access availability of the respective banks indicated by the $t_{RC}$ distribution.

In step 832, the selected block of data bursts is written into respective memory locations according to the sequence determined in step 830. As previously mentioned, even though the memory locations for these data bursts are consecutive locations in the memory, the order for writing the data bursts does not have to be in the order of the consecutive memory locations.

After the block of data bursts is written, the memory location for the write pointer is updated, as shown in step 834. In one embodiment, the write pointer is updated so that a subsequent writing data bursts will start at a location immediately following (e.g., consecutive to) the last written memory location, which allows for a more efficient use of available memory. However, other alternatives for the write pointer location for subsequent writing may also be acceptable. The method may then proceed to step 804 (in FIG. 8A) for writing another data packet, if needed. Alternatively, other tasks (not shown), including accessing memory locations for reading one or more data packets, may also be performed, as needed. Again, data packets may be read either in-sequence or out-of-sequence.

The example in FIG. 8 is meant to illustrate one method of storing data in a memory according to the present invention. It is understood that other variations in the method steps may also be devised without departing from the scope of the invention. Furthermore, the method can be used in various combinations with other functions or tasks typically performed by the memory controller.

Figure 9:
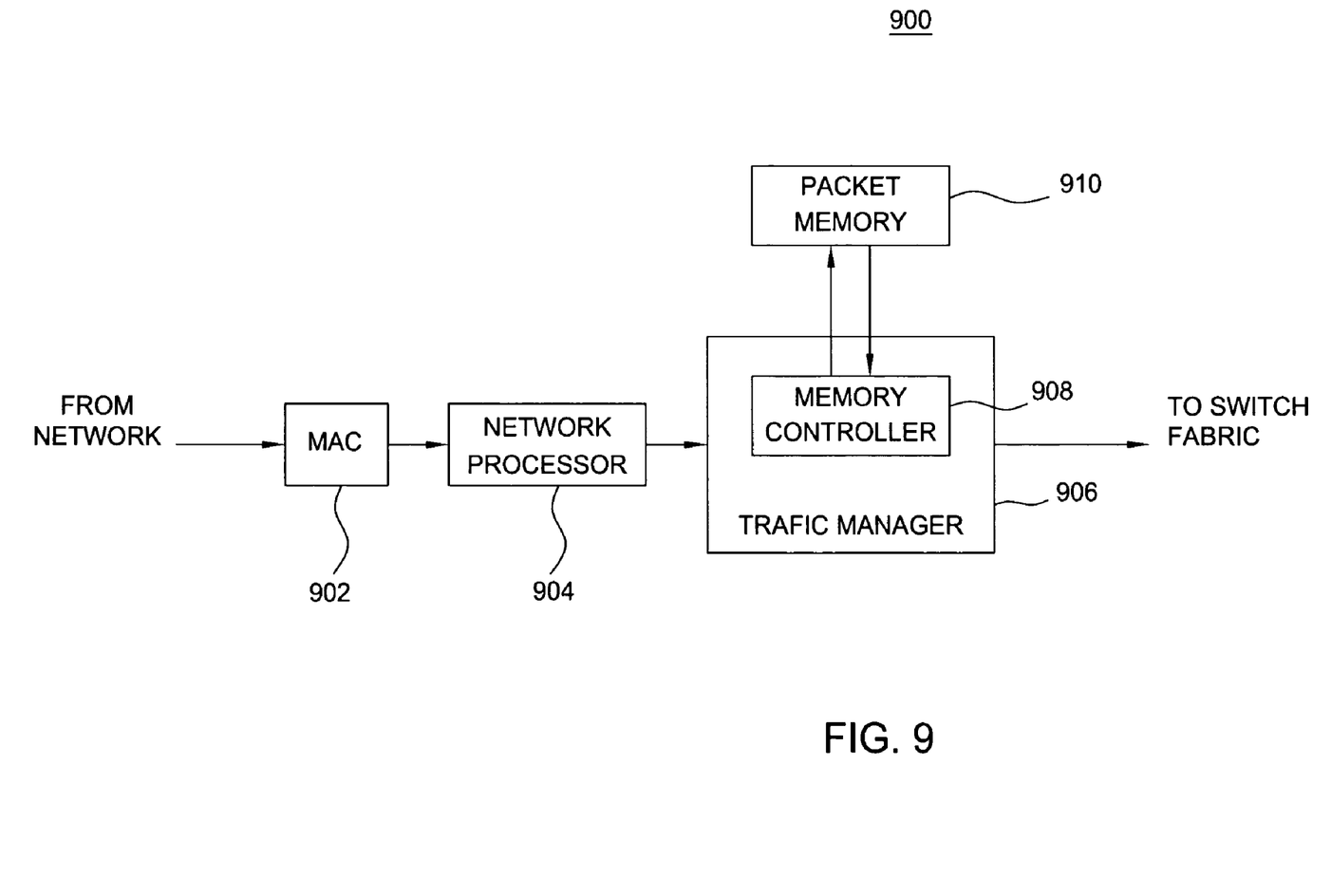
FIG. 9 is a schematic illustration of one embodiment of an apparatus suitable for implementing the method of the present invention.

As one skilled in the art will appreciate, the method of this invention can be used in any memory controller in a wide variety of applications, e.g., gaming consoles, any internet servers, mobile computing devices, cell phones, and so on. In the case of networking applications, method of the present invention can be implemented by a memory controller (e.g., controller 908 of FIG. 9) of a traffic manager on a packet line card such as an Ethernet card. FIG. 9 illustrates some components typically found on such a line card. A memory controller 908, which is provided in a traffic manager (TM) 906, is coupled to a memory 910, e.g., a DRAM. Packets from the network, i.e. the Ethernet port, are received by the media access controller (MAC) 902 and then forwarded to the network processor (NP) 904. The NP 904 takes the forwarding decision for each packet and selects the memory queue for the TM 906, i.e. after the packet classification in the NP 904 the TM 906 writes the packets to the memory 910. At the same time the TM 906 receives credits from the scheduler. Once the credits are accepted the TM 906 will release certain packets from their queues, i.e. the TM 906 will read packets from the memory 910 and forward them to the switch fabric.

While the foregoing is directed to embodiments of the present invention, other and further embodiments of the invention may be devised without departing from the basic scope thereof, and the scope thereof is determined by the claims that follow.

The invention claimed is:

1. A method of data access and storage, the method comprising:
   (a) providing a memory having a number of locations characterized by M banks and N lines, where M and N are positive integers;
   (b) providing a data packet having a plurality of data bursts;
   (c) analyzing current statistics on latency in accessing ones of the M banks;
   (d) determining a sequence to write the data bursts to memory based on the statistics; and
   (e) writing the data bursts to a plurality of memory locations to store the data packet, wherein the data bursts are stored in respective ones of the M banks according to the determined sequence.

2. The method of claim 1, further comprising:
   (f) reading the data bursts from the plurality of consecutive memory locations.

3. The method of claim 2, wherein at least one of steps (e) and (f) is performed by accessing the plurality of data bursts out of sequence from the first plurality of consecutive memory locations.

4. The method of claim 2, wherein at least one of steps (e) and (f) is performed by accessing the plurality of data bursts in sequence from the first plurality of consecutive memory locations.

5. The method of claim 1, wherein the memory is a dynamic random access memory (DRAM).

6. An apparatus, comprising:
   a memory having memory locations characterized by banks and lines;
   a memory controller coupled to the memory for storing and retrieving a data packet having a number of data bursts;
   wherein the memory controller is configured to store the number of data bursts in sequence in a plurality of consecutive locations in the memory based on current statistics on latency in accessing the memory banks.

7. The apparatus of claim 6, wherein the memory controller is further configured to access the plurality of consecutive memory locations to allow at least one of reading and writing the data bursts in an out-of-sequence manner.

8. The apparatus of claim 6, wherein the memory controller is further configured to access the plurality of consecutive memory locations to allow at least one of reading and writing the data bursts in an in-sequence manner.

9. The apparatus of claim 6, wherein the memory is a dynamic random access memory.

10. The apparatus of claim 6, wherein the memory controller is provided in a traffic manager of a packet line card for telecommunication application.

* * * * *